Dec. 11, 1934.  S. P. LOVELL  1,983,622
SHOE STIFFENER AND METHOD OF MAKING THE SAME
Filed June 26, 1931   3 Sheets-Sheet 1
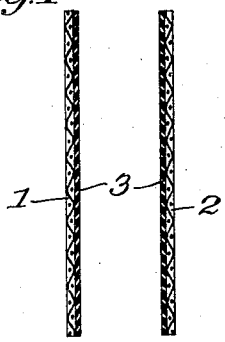
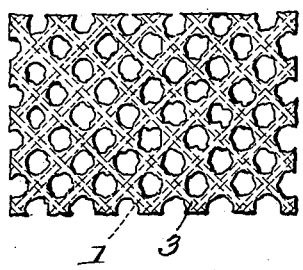
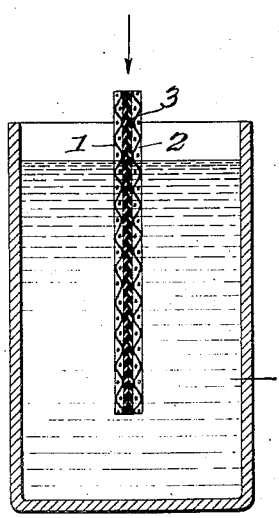
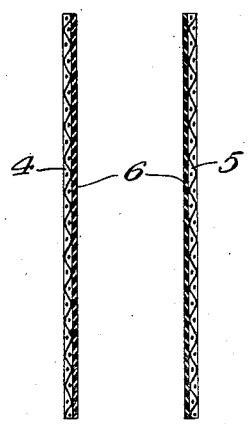
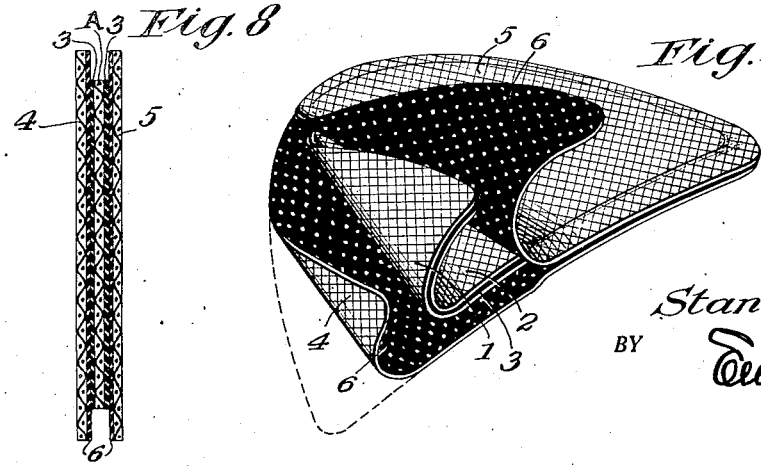
INVENTOR.
Stanley P. Lovell
BY
ATTORNEY.

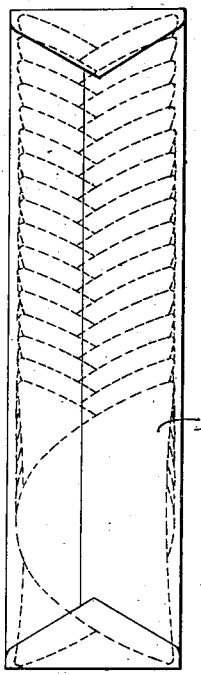
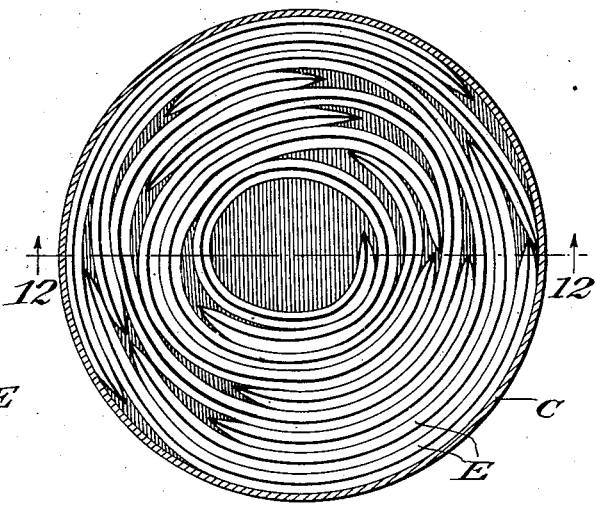
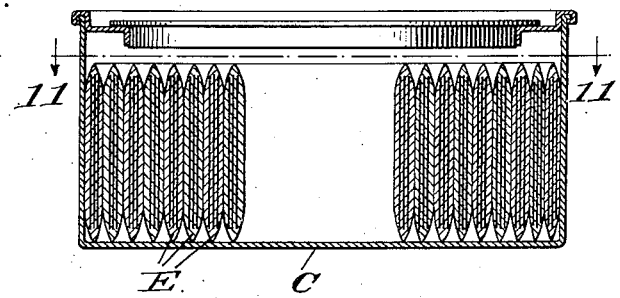
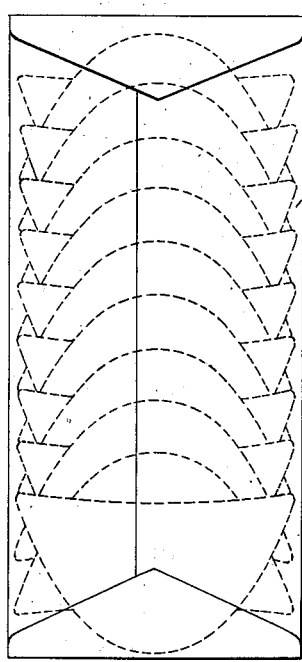
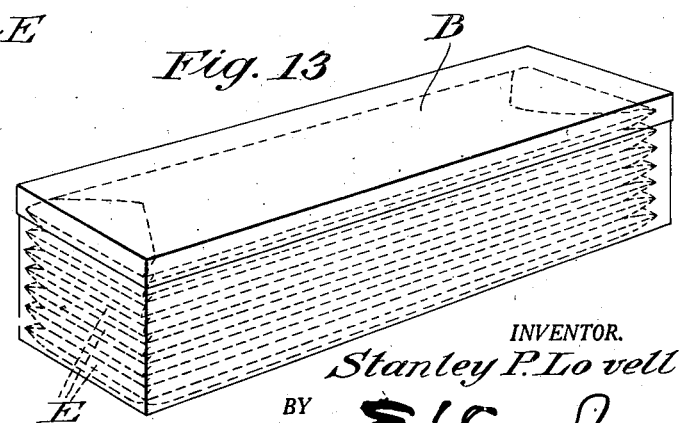
INVENTOR.
Stanley P. Lovell Dec. 11, 1934. S. P. LOVELL 1,983,622
SHOE STIFFENER AND METHOD OF MAKING THE SAME
Filed June 26, 1931   3 Sheets-Sheet 3

Inventor
Stanley P. Lovell
by Wright Brown Quinby & May
Attys

Patented Dec. 11, 1934

1,983,622

UNITED STATES PATENT OFFICE 1,983,622

SHOE STIFFENER AND METHOD OF MAKING THE SAME

Stanley P. Lovell, Newton, Mass., assignor to Arden Box Toe Company, Watertown, Mass., a corporation of Massachusetts Application June 26, 1931, Serial No. 547,170

16 Claims. (Cl. 12—146)

My present invention relates to box toes for shoes and box toe blanks for shoe manufacture, and particularly to such toes and blanks of moldable type, that is to say, those capable of being shaped in lasting and thereafter attaining a set by which they have a more or less degree of rigidity or resistance and to be so shaped and lasted with the maximum of speed and the minimum of those difficulties generally incident in factory operation.

A great many types of toes of this class have been heretofore devised. In the development of the art certain difficulties have been encountered. From the advantages and disadvantages of the prior art have come certain desiderata to the attainment of which my present invention is directed. One very desirable factor is that the blanks shall be in condition for the operator to use without the delay of preparation or preliminary softening step prior to assembly and pulling. Another is that the toe blanks be available in such prepared state and in readily handled condition, particularly as to freedom from adhesion. A third highly desirable but heretofore unattained feature is that a toe stiffener of this type should have when in the shoe a sufficient porosity to provide ventilation for the foot both for the reduction of temperature and for the elimination of moisture and the like due to the presence of the foot in the shoe. Concurrent with this third feature and also not hitherto attained is the further highly desirable characteristic that the proportion of plasticized stiffening agent to the fibrous base is so small that when the shoe is being lasted the wiping in of the upper materials is ineffective to cause the extrusion of the stiffening agent from the stiffener margins.

These capabilities while desired jointly seem to have heretofore involved relative inconsistencies which prevented their attainment in any one construction. I have by my present invention produced a new type of toe blank and box structure by which these attributes are attained and also various other advantages, all as will appear in the description which follows:

According to my present invention I employ a celluloid stiffening medium which has all the advantages of celluloid without involving the difficulties previously experienced in its use. These difficulties have resided either in the necessity of partially dissolving the celluoid immediately prior to use, or, if the celluloid was initially softened, in the sticking of the toe blanks to each other in course of manufacture or prior to use.

An additional difficulty in the use of celluloid in box toes has been due to the precipitation of the celluloid, especially in humid weather. The relatively high volatility and large amount of the solvent content of celluloid box toes softened for lasting causes rapid evaporation and the consequent cooling of the surrounding air so that some of its moisture content has been condensed and deposited as dew on the surface of the material. This precipitated moisture, in its turn, threw the celluloid out of solution and caused it to precipitate. The result was a very high variation in the product with frequent soft spots and with a general weakening of the bridge effect of the stiffener in the shoe. The precipitation of the celluloid also correspondingly lessened its adhesive property.

In my preferred type of box toe, due to the woven nature of the box toe structure, and the amount of stiffening agent used, all voids are not filled, the vacant, unsaturated spaces affording air channels therethrough. When incorporated in a shoe such a stiffener allows ventilation of the toe portion of the shoe and prevents it from becoming the depository of accumulated perspiration, which would otherwise be pocketed in the forepart of the shoe causing malodor, footburn and cracky innersoles. A stiffener of my preferred type also adheres to the lining and doubler of the shoe upon lasting, although the blanks as prepared for use in all except turn shoes are not mutually adherent when in packed relation.

My present invention provides for the avoidance of the difficulties hereinbefore mentioned by providing a celluloid box toe blank ready prepared for use and yet easily handled by the operator without any retardation of his normal speed. Toe blanks may be prepared in accordance with my invention in a variety of forms and by somewhat varied treatment, but for the purposes of my present invention I will show and describe only certain typical forms in themselves well adapted to use, and will also indicate certain variations or adaptations which may be used to meet special requirements.

I call attention to one distinctive characteristic of the blanks prepared for shoes other than turn as I believe that it represents a concept entirely new in this art. This consists in the toe blank having an interior impregnation of plastic in a fluent colloidal state, the blank having a surface through which this interior plastic may penetrate by exudation or eruption under such pressure as is incident to pulling over or other lasting operations. While the plastic may penetrate through the surfaces of the stiffener yet the relative amount of this plastic to the relatively fixed fibrous content of the stiffener is so small that squeezing out or extrusion of the plastic in alignment with the stiffener surfaces about the edges of the stiffener under the wiping pressure of the bed wipers in lasting does not take place. Formerly, in the manufacture of shoes which were largely of the welt type these lateral exudations subsequent to the wiping process or operation were of relatively minor importance, since the surplus box toe upper and lining was trimmed off close to the innersole, and of course the extruded surplus was trimmed off therewith. With the advent of cement shoes, that is, shoes in which the upper and sole are affixed by an adhesive rather than by stitching, the extrusion of box toe compound from the box toe blank became of vital importance. In this latter type of shoe the wiping or bedding operation does not terminate at the inseam flange or shoulder, there being no flange or shoulder, the upper and box toe being laid over the flat insole and wiped directly in full contact with the insole. Where this is done any extrusion from the box toe forms a colloidal compound at the margin of the combined box toe and upper, this compound acting to greatly embarrass the subsequent operations. Specifically, if latex or rubber sap is used to stick down the lasted-in upper to the insole, the colloidal compound will serve to coagulate the latex, and after a few shoes are operated the latex dispensing medium itself is coagulated. Again, where latex is not used the workman will nevertheless get the box toe extrusion compound on his fingers, preventing his nimble work and causing damage to delicate shoe upper stock by transfer in handling.

In the accompanying drawings:

Figure 1 is a sectional view showing one form of my invention wherein the center or core body of the stiffener consists of two fabric laminæ each coated on its inner face with a plastic impregnant, and showing the laminæ before they are pressed together.

Figure 2 is a diagram of such center or core showing on an exaggerated scale the porous nature of the uncovered core body.

Figure 3 is a sectional view showing the core body laminæ adhered together.

Figure 4 is a diagrammatic sectional view showing the step of immersing such core body in a solvent for the plastic impregnant.

Figure 5 shows in section a pair of cover laminæ which are adapted to be fixed to the outer faces of the core body to form therewith the finished stiffener unit, the inner faces of such cover laminæ being individually coated with an adherent coating.

Figure 6 is a sectional view showing such cover laminæ adhered to the core body and particularly illustrating the substantially non-adhesive character of the exterior surfaces of the stiffener unit.

Figure 7 is a perspective view of the finished stiffener unit with portions turned back to expose the coated and uncoated surfaces.

Figure 8 is a sectional view showing a modification wherein the core body is formed of a single lamina, the exterior faces of which are coated with a plasticized impregnant and covered by a pair of internally coated cover laminæ.

Figures 9 and 10 are views showing one method of arranging a predetermined count of stiffener units in a substantially vapor-proof envelope.

Figures 11 and 12 show such envelopes packed in a round container, Fig. 11 being a section on the line 11—11, of Fig. 12, and Fig. 12 being a section on the line 12—12 of Figure 11.

Figure 13 shows in perspective a modified form of container; and

Figure 14 shows a modification in the arrangement of the stiffener units in the vapor-proof envelope.

Figure 15:
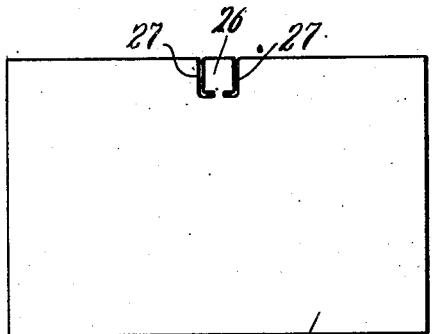

Figure 15 is a plan of a separator layer prepared to receive a treated stiffener, particularly suitable for use in a turn shoe, and prior to packaging.

Figure 16:
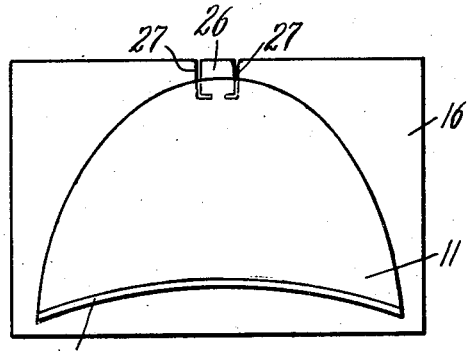

Figure 16 is a plan view showing the treated stiffener in place on the separator layer.

Figure 17:
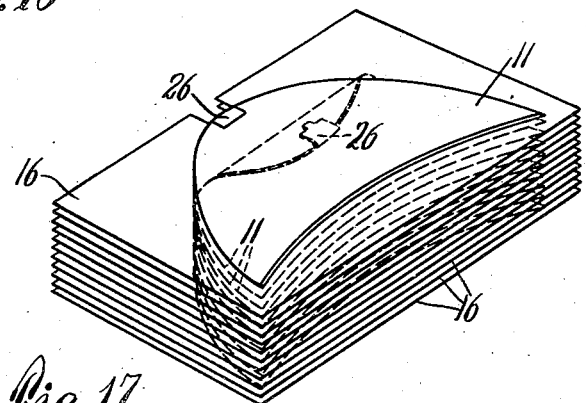

Figure 17 shows in perspective a stack of stiffeners with interposed separator layers, showing in dotted lines the manner in which the stiffeners can be removed successively from the stack for use.

Figure 18:
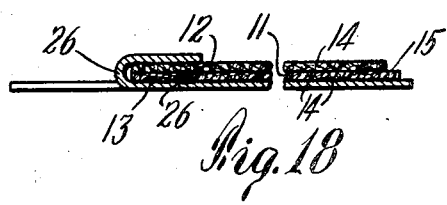
Figure 19:
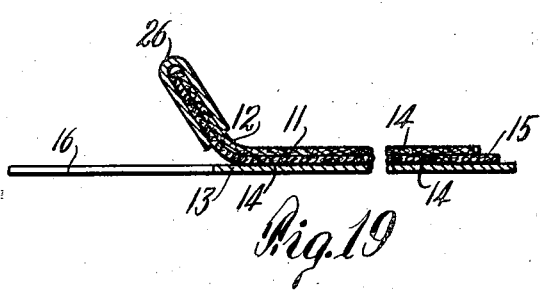

Figures 18 and 19 are sections through a stiffener and separator layer showing successive stages in the removal of the stiffener from the separator layer.

In its simplest form which I now deem practicable, I take a blank of fabric as A in Figure 8, or preferably plural blanks 1 and 2 (Fig. 1) in order to gain the advantage of crossed fibre trend and of ultimate marginal taper to get the desired thin edge for the box. Such blanks independently or together I impregnate with my plastic, indicated generally at 3. This plastic preferably is an ester of cellulose. In practice I prefer to die the blanks from a sheet impregnated or coated with the stiffening agent. The blanks to form the core and containing the stiffening agent in unplasticized condition are pressed together as shown in Figure 3 and then dipped in a suitable solvent S as shown in Figure 4. The ratio of coating plastic to fibrous material is so proportioned that the amount of solvent retained by the layers is sufficient to plasticize the plastic but insufficient to thin the plastic to such a degree that it may escape or drain out from the fibrous foundation, and the amount of plastic material, as will later more fully appear, is insufficient to completely fill the voids of the fibrous base. With such a proportion of plastic material to fibrous material the plastic material cannot be forced ahead in the general direction of the fabric layers by the repeated action of the wipers during the lasting operation sufficiently to be extruded from the edges of the stiffener, the fibers forming the boundaries of the voids acting as dams to prevent any such action. The ratio of solvent to stiffening agent and base material retained by the blank under such conditions is such also that adhesion between adjacent contacting superposed blanks, after the agent has been completely acted on by the solvent and is in colloidal condition, is insufficient to prevent ready manual separation of the blanks. The solvent into which the blanks are dipped is preferably a non-aqueous volatile solvent which is so constituted that the time of rigidifying when the stiffener is exposed to the air may be predetermined within reasonably close limits to conform to the requirements of the particular shoe factory in which the shoes are to be made. Where ester of cellulose is used as the stiffening agent the particular solvents which may be employed may vary considerably. Certain examples of such solvents are denatured alcohol, acetone, glycol ester derivatives such as diethylene, glycol monoethylether, ethylene, glycomonobutyl ether, ethyl acetate; cyclo-hexanol, and 4-hydroxy-2-keto-4-methyl-pentane. The denatured alcohol and acetone are solvents which cause a very short time of setting, while the glycol ester derivatives are slow in their action. The ethyl acetate is fast, but leaves an odor which in some cases may be objectionable. By properly combining these or other solvents, the time of setting of the stiffening agent may be quite accurately predetermined from a few minutes to several hours.

Where the center or core body consists of a pair of laminæ, as 1 and 2, in Figs. 1 to 4 inclusive, the internal faces of the laminæ are coated with the cellulose ester 3 and afterwards plasticized by immersion in the solvent S. Where such center or core body is a single lamina, as A in Fig. 8, the outer faces of such lamina are coated with the cellulose ester 3 and afterwards plasticized by immersion in the solvent.

With either form, before solvent treatment, the cellulose ester is indifferently entrained between the filamentary contacts of the lamina or laminæ without substantially blocking the interstitial porosity of the blank body. This I have endeavored to show diagrammatically and on exaggerated scale in Fig. 2.

After impregnation, the center or core body is enclosed within a pair of cover blanks 4 and 5 of slightly larger size and of like material which are impregnated with the cellulose ester on their inner faces, as indicated at 6 (Fig. 5). Actually I prefer to blank out these skin or cover pieces from sheet material. I then assemble the multiply plastic toe blank body or core with a pair of these external blanks disposed with the cellulosic material 6 innermost (Fig. 6). In pressing these together, the solvent of the internal plastic 3 attacks the inner face of the unplasticized cellulose coating 6 of the outer members and bonds them together.

The box toe blanks are now ready for packing, but in order that they may be ready for use in shoemaking it is necessary that they be sealed against evaporation. I preferably pack my blanks first in tight packs, as for example, in so-called glassine envelopes E placing in each envelope a standard number of toe blanks, as for example, sufficient for one case of shoes. In assembling these in envelopes the toe blanks are preferably arranged in staggered alternate sequence, as shown either in Figs. 9 or 14, which represent alternative arrangements of blanks. When the envelope is opened the blanks will be in a position where they can be rapidly picked up by the operator and assembled into the shoes. I preferably pack a plurality of these envelope packs in a can C, Figs. 11 and 12, or a box B, Fig. 13, which is sealed tight for shipment and which can be again closed if all of the envelope packs are not used at once. The stiffeners when treated and then packaged, as thus described, become in usable condition within a short period, the length of which is dependent largely on the particular solvent used, but is in any case not more than a few hours, and they remain in this condition thereafter until after the package is opened and they are exposed to evaporation of the solvent.

From the foregoing, it will be evident that I provide a blank having a solvent sustained plastic interior and non-adhesive exterior which however becomes adhesive upon an exuding pressure which the blank encounters in the usual operation of lasting, and that this exuding pressure displaces the solvent softened plastic from the interior of the blank so that it will be uniformly fused to adjacent shoe parts. Prior to being subjected to such exuding pressure, the interlaminal cohesive solvent containing filling is indifferently entrained between the filamentary contacts of the fabric laminæ. Moreover, my invention requires no plasticizing agent to be kept in the shoe factory whatever, as the box toe blank contains within the very heart of itself, due to the nature of its assembly, and packing a continued and indefinite retained plasticity.

The blanks may be cut with the weave running in any desired direction and where additional strength is desired the weave of the different blanks may be arranged in different directions. It will also be understood that felt might be substituted for fabric, the term fabric being merely suggestive of preferred material in which the presence of the weave is of certain advantage. Felt fabric or other material may be variously combined, as for example, a felt center with fabric outer pieces. It will also be understood that any number of these pieces may be built up to make a toe blank of required thickness.

Inasmuch as my shoe stiffener is inherently both solvent-plastic and thermo-plastic it also offers certain advantages over existing stiffeners insofar as lasting is concerned. Shoes heretofore have been lasted by one of two methods; either a thermoplastic box toe and/or counter was used in which case the shoe is subjected to heat at both pulling and bedding operations, or, alternatively a solvent-softened box toe and/or counter was used in which case the shoe was perforce lasted before the solvent had dissipated or evaporated. The disadvantage of the first type of lasting is that the dual application of heat is deleterious to many leathers. The disadvantage of the second type of lasting is that the whole lasting operation must be so timed that in spite of varying atmospheric conditions and varying flow of work, the shoe must be completely lasted before the solvent employed in box toe or counter has passed the critical stage of evaporation or where it became too "tinny" or resistant to wipe in without wrinkling. In many factories the employees have been forced to work on a staggered shift, the pullers preceding the bed operators by hours, the bed operators working hours after the pullers have left. Particularly has this been bothersome on week ends and holidays.

A shoe stiffener constructed in accordance with this invention is inherently both solvent-plastic and thermo-plastic so that it avoids the disadvantages of both methods. It may be primarily lasted or pulled by virtue of its solvent plasticity and upon becoming stiff and "tinny," because of evaporation of solvent, it may be secondarily lasted or bedded when softened by heat by virtue of its thermoplasticity.

In Figures 15 to 19 is illustrated a stiffener constructed particularly suitable for use in connection with turn shoes, an external face of each stiffener being in tacky condition when it is assembled in the shoe so that it may adhere firmly to the adjacent shoe part or parts so as to permit turning of the shoe after lasting without displacing the stiffener. This stiffener is made of coated layers as previously described, but instead of the outer layer or layers being arranged with their coated faces turned inwardly one or both are reversed in position so that the coated surface is presented outwardly.

The stiffeners after treatment with the solvent are then, by one method, stacked between protective separator layers to which they do not strongly adhere and the separator layers are so formed as to facilitate the placing of the stiffeners in assembled relation in shoes.

Referring to Figures 15 to 19, 11 indicates a shoe stiffener, such for example as a box toe, which is composed of one or more plies of fabric as 12 and 13 which are coated on one or both faces (preferably both) with a suitable solvent-softened stiffening agent, such, for example, as an ester of cellulose as at 14. This coating is preferably applied to the fabric before it is died out into stiffener blanks, and where two or more plies are employed, one at least of these plies is preferably somewhat larger than the others in order to form a marginal extension 15, particularly along the rear edge of the toe stiffener to present a thin edge, thus eliminating the necessity of skiving the completed stiffener to produce this desired thin edge which tends to avoid a visible line of demarcation between the stiffened and unstiffened portions of the completed shoe.

Where more than one ply is used, both plies are dipped in the desired solvent and are then assembled in face to face relation, leaving the desired overlap about the margin, on a separator layer or sheet 16 to which the softened stiffening agent will not strongly adhere, such for example, as a sheet of waxed paper which is thin, non-absorbent and substantially unaffected by the solvents. When a blank is dipped the solvent is immediately absorbed by the fabric base and attacks the stiffening agent, which, after it has been acted on for a sufficient length of time, is softened to a tacky condition. After a stiffener has been thus dipped and laid on a separator sheet 16, another separator sheet is laid thereon and another stiffener is dipped and assembled on the second separator sheet, this process being carried on until a stack of alternate stiffeners and separator sheets has been made to the desired number of stiffeners. The stack is then placed in a suitable container which may be hermetically sealed to avoid the evaporation of solvent and to permit the stiffening agent to soften and reach its desired colloidal or "mulled" condition.

When it is desired to use the stiffeners the container is opened and the stiffeners are pulled away one after another from their separate layers and placed in position in the shoes with the tacky face or faces against the desired shoe part or parts to which they immediately adhere. In order to facilitate the removal of the individual stiffeners from the separator sheets and their assembly in the shoes without danger of injuring the tacky surface or soiling the fingers or shoe parts with the tacky material, each of the separator sheets may be provided with a portion such as 26, defined by weakened portions or partial cuts as at 27 from the remainder of the sheet so that the shoe operative can fold one part of the weakened portion over the edge of the stiffener, as shown in Figure 18, thus to form with the remainder of the portion 26 a non-sticky finger hold at the stiffener edge. This may be grasped between the operator's fingers and by pulling the portion 26 may be entirely detached from the separator sheet, as shown in Figure 19 and in dotted lines in Figure 17, whereupon the stiffener may be readily peeled off from the separator sheet and applied to the shoe in proper position without the fingers touching any portion of the tacky surface and without any contact between this surface with other parts of the shoe or with the operator's clothing. Where the portion 26 is applied to the margin of the stiffener which is lasted in during the lasting operation, no difficulty is experienced by reason of the fact that this portion of the stiffener will not adhere to the shoe. Hence it is quite unnecessary to remove the portion 26 from the stiffener.

The external coating of stiffening agent is acted on by the solvent while in contact with the separator layer and this layer has the effect to cause the surface coating when in softened condition to be of a jelly like consistency which condition adapts the stiffener admirably for immediate application to a shoe.

This application is a continuation in part of my application Serial No. 234,231, filed November 18, 1927, for Shoe stiffeners and art of producing the same. The specific form of this invention disclosed in Figures 15 to 19 is not claimed herein as it forms the subject matter of my Patent No. 1,843,687 granted February 2, 1932, for Shoe stiffeners.

From the foregoing description of certain embodiments of this invention it should be evident to those skilled in the art that various other modifications and changes might be made without departing from the spirit or scope of this invention as defined by the appended claims.

I claim:

1. The method of making stiffeners for shoe parts, which consists in assembling a solvent plasticizable center or core body together with solvent, in covering the same with integuments of unplasticized material, and in compressing the assembly to cause the solvent of the solvent-plasticized core to attack the unplasticized coverings and bond the assembly together as a unit stiffener.

2. A stiffener blank having an interior fibrous portion impregnated with fluent plastic material, and a porous unimpregnated surface through which fluent plastic material may exude from said interior portion under lasting pressure and adhesively secure said blank to adjacent shoe parts, said plastic material being insufficient in amount to completely fill the voids of the blank, whereby the lasted blank has sufficient porosity to permit the passage of air and moisture therethrough.

3. The method of making stiffeners for shoe parts which consists in covering a fibrous body containing a plastic and a solvent in different portions with an integument of unplasticized material.

4. The method of making shoe stiffeners conditioned for lasting, which comprises treating a fibrous foundation containing an unplasticized stiffening agent with a plasticizer of said agent, covering the treated foundation with fibrous material free from said plasticizer, and then sealing the stiffener against evaporation of said plasticizer.

5. The method of making shoe stiffeners conditioned for lasting, which comprises treating with a solvent stiffener blanks carrying a solvent-softened stiffening agent in unsoftened condition, and assembling them on an untreated blank, applying an untreated blank to the upper face of the treated blanks, and sealing the stiffener thus formed against substantial evaporation of the solvent.

6. A shoe stiffener blank conditioned for assembly in a shoe, which comprises outer layers of porous fabric enclosing woven fibrous fabric containing a plasticized stiffening agent uniformly distributed throughout, said plasticized agent being sufficient in quantity and fluidity to be exuded through said outer layers under lasting pressure.

7. A shoe stiffener blank conditioned for assembly in a shoe, which comprises outer layers of porous fabric enclosing woven fibrous fabric containing a plasticized stiffening agent uniformly distributed throughout, said plasticized agent being sufficient in quantity and fluidity to be exuded through said outer layer under lasting pressure and insufficient in amount to render the stiffener non-porous after evaporation of the plasticizing solvent.

8. A lasted shoe stiffener comprising a porous fibrous body having a stiffening agent distributed therethrough, said agent coating the fibers without substantially blocking the interstitial porosity of the stiffener.

9. A lasted shoe stiffener comprising a porous fibrous base containing a solvent-softened stiffening agent coating the fibers thereof but insufficient in amount to completely fill the voids of said base whereby the stiffener has sufficient porosity to permit the passage of air and moisture therethrough.

10. The method of making shoe stiffeners which comprises assembling a fibrous center or core body containing a solvent-softened stiffening agent and with sufficient solvent entrained by the fibers of said body to completely plasticize said agent, and covering the same with fibrous layers free from solvent.

11. The method of making shoe stiffeners which comprises assembling a fibrous center or core body containing a solvent-softened stiffening agent and with sufficient solvent entrained by the fibers of said body to plasticize said agent, and covering the same with fibrous layers free from solvent but carrying said agent.

12. The method of making shoe stiffeners which comprises assembling a fibrous center or core body containing a solvent plasticizable stiffening agent and solvent therefor, and covering the same with solvent free layers carrying such agent in unplasticized condition.

13. The method of making shoe stiffeners which comprises assembling on covering blanks free from solvent stiffener blanks cut from fibrous sheet material containing a solvent softened stiffening agent while such stiffener blanks contain sufficient solvent entrained by the fibers to completely plasticize said agent.

14. The method of making shoe stiffeners which comprises assembling on covering blanks free from solvent stiffener blanks cut from fibrous sheet material containing a solvent softened stiffening agent while such stiffener blanks contain sufficient solvent entrained by the fibers to completely plasticize said agent, and then sealing the assemblies against evaporation of said solvent.

15. A shoe stiffener comprising fibrous material and a plasticizable stiffening agent, the proportion of stiffening agent relative to the fixed fibers of the stiffener being sufficiently small to prevent extrusion of said agent at the edge of the stiffener from wiping lasting pressure.

16. A shoe stiffener comprising fibrous material and a solvent plasticizable stiffening agent, the proportion of stiffening agent relative to the fixed fibers of the stiffener being sufficiently small to prevent extrusion of said agent at the edge of the stiffener from wiping lasting pressure.

STANLEY P. LOVELL.